United States Patent
Durai (10) Patent No.: US 7,360,223 B2
(45) Date of Patent: Apr. 15, 2008

(54) ARRANGEMENTS AND METHODS FOR INVOKING AN UPCALL IN A COMPUTER SYSTEM

(75) Inventor: Vishwas P. Durai, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 866 days.

(21) Appl. No.: 10/670,482

(22) Filed: Sep. 24, 2003

(65) Prior Publication Data

US 2005/0066332 A1  Mar. 24, 2005

(51) Int. Cl.
 *G06F 3/00* (2006.01)
(52) U.S. Cl. ...................................... 719/328
(58) Field of Classification Search ................. 719/328
See application file for complete search history.

(56) References Cited

U.S. PATENT DOCUMENTS 5,680,618 A * 10/1997 Freund ........................ 707/7
5,872,936 A * 2/1999 Eckstein ..................... 710/107
2004/0055003 A1 * 3/2004 Sundaram et al. .......... 718/108

OTHER PUBLICATIONS

Aries(5), Itanium processor Family Only HP-UX 11i Version 1.6: Jun. 2002.*

* cited by examiner

*Primary Examiner*—William Thomson
*Assistant Examiner*—LeChi Truong (57) ABSTRACT

A computer-implemented method for executing an application system call that involves invoking a kernel thread from a system call stub in a user space of an operating system of the computer. There is included saving user space context data in a save state upon entering a kernel space of the operating system from the user space. There is further included modifying a return pointer in the save state to an address of a unblock handler call stub in user space instead of an address of the system call stub in the user space, thereby causing the kernel thread to return to the unblock call handler stub instead of returning to the system call stub when the kernel thread completes execution.

26 Claims, 7 Drawing Sheets

ARRANGEMENTS AND METHODS FOR INVOKING AN UPCALL IN A COMPUTER SYSTEM

BACKGROUND OF THE INVENTION

The execution of a multi-threaded application program in a computer system generally involves a large number of threads, both in the user space and in the kernel space of the operating system. Generally speaking, the user-space threads are serviced by corresponding kernel threads in the kernel space of the operating system.

Figure 1:
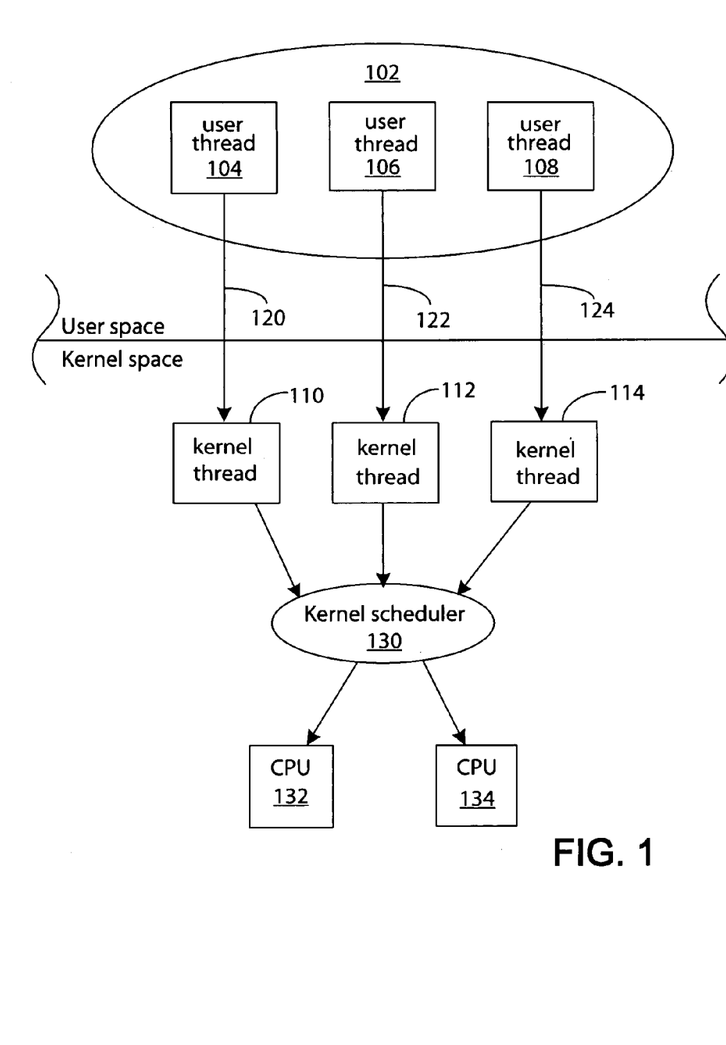
FIG. 1 shows a 1×1 thread model wherein an application program generates three user-space threads.

In the 1×1 thread model, there is a corresponding kernel thread for each existing user-space thread. To facilitate discussion, FIG. 1 shows a 1×1 thread model wherein an application program 102 generates three user-space threads 104, 106, and 108. These user-space threads are serviced by corresponding kernel threads 110, 112, and 114 in the kernel space of the operating system. The one-to-one correspondence between user-space threads and kernel threads are shown by the three lines 120, 122, and 124. The three kernel threads are scheduled for execution by a kernel scheduler 130 on two processors 132 and 134 of FIG. 1.

A complex application program may create hundreds or thousands of user-space threads during its execution lifetime. If a kernel thread is required for each existing user-space thread, thousands of kernel threads may exist concurrently, all of which require a large amount of resources in the kernel. Given the fact that kernel resources are expensive, the 1×1 thread model is therefore not necessarily the most efficient.

Figure 2:
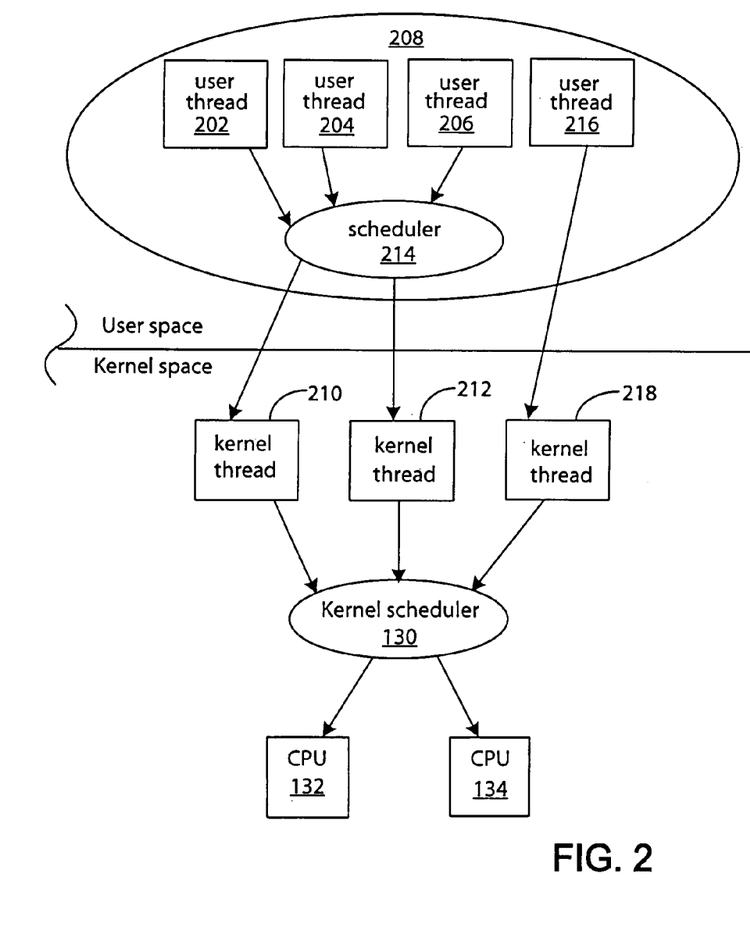
FIG. 2 shows an M×N thread model in which a smaller number (N) of kernel threads exist for a larger number (M) of user-space threads.

FIG. 2 shows a M×N thread model in which a smaller number (N) of kernel threads exist for a larger number (M) of user-space threads. With reference to FIG. 2, three user-space threads 202, 204, and 206 from an application program 208 are serviced by two kernel threads 210 and 212 via a user-space scheduler 214, which may implement any suitable scheduling algorithm (e.g., round-robin, weighted round-robin, modified round-robin, etc.). Another user-space thread 216 is shown having a dedicated kernel thread 218 to illustrate that the M×N thread model may also nave dedicated one-to-one relationships between user-space threads and kernel threads in order to provide backward compatibility and/or to improve performance for certain user-space threads/applications.

Since fewer kernel threads are multiplexed among a larger number of user-space threads in FIG. 2, less kernel resource is required to service the application. Since kernel resources are expensive, the M×N thread model has become increasingly popular.

The M×N thread model however requires a facility in the kernel to invoke a routine in the user space during system call returns. This facility, called "upcall," is substantially similar to a signal handler in its requirement for the execution of a user-space routine from the kernel. Currently, the invocation of the user-space routine from the kernel is required during a system call return or a trap return from the kernel.

Figure 3:
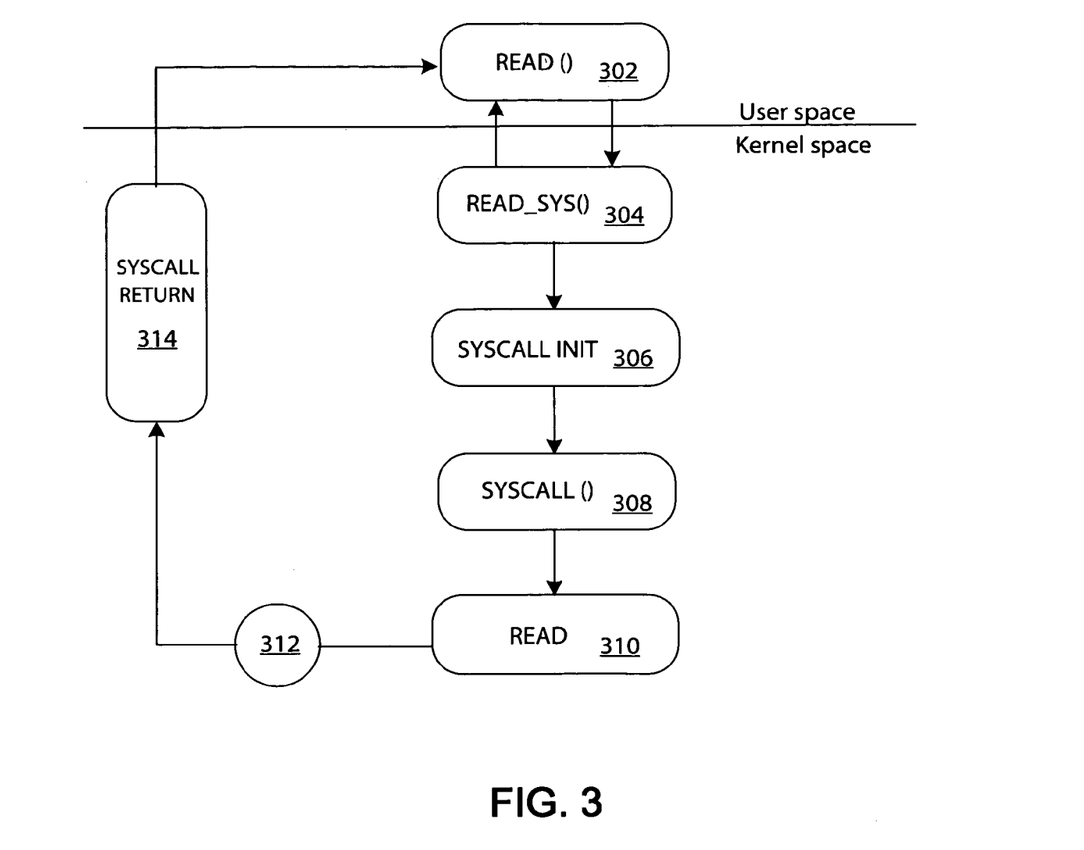
FIG. 3 illustrates a simplified method of handling systems calls between the user-space and the kernel space.
Figure 4:
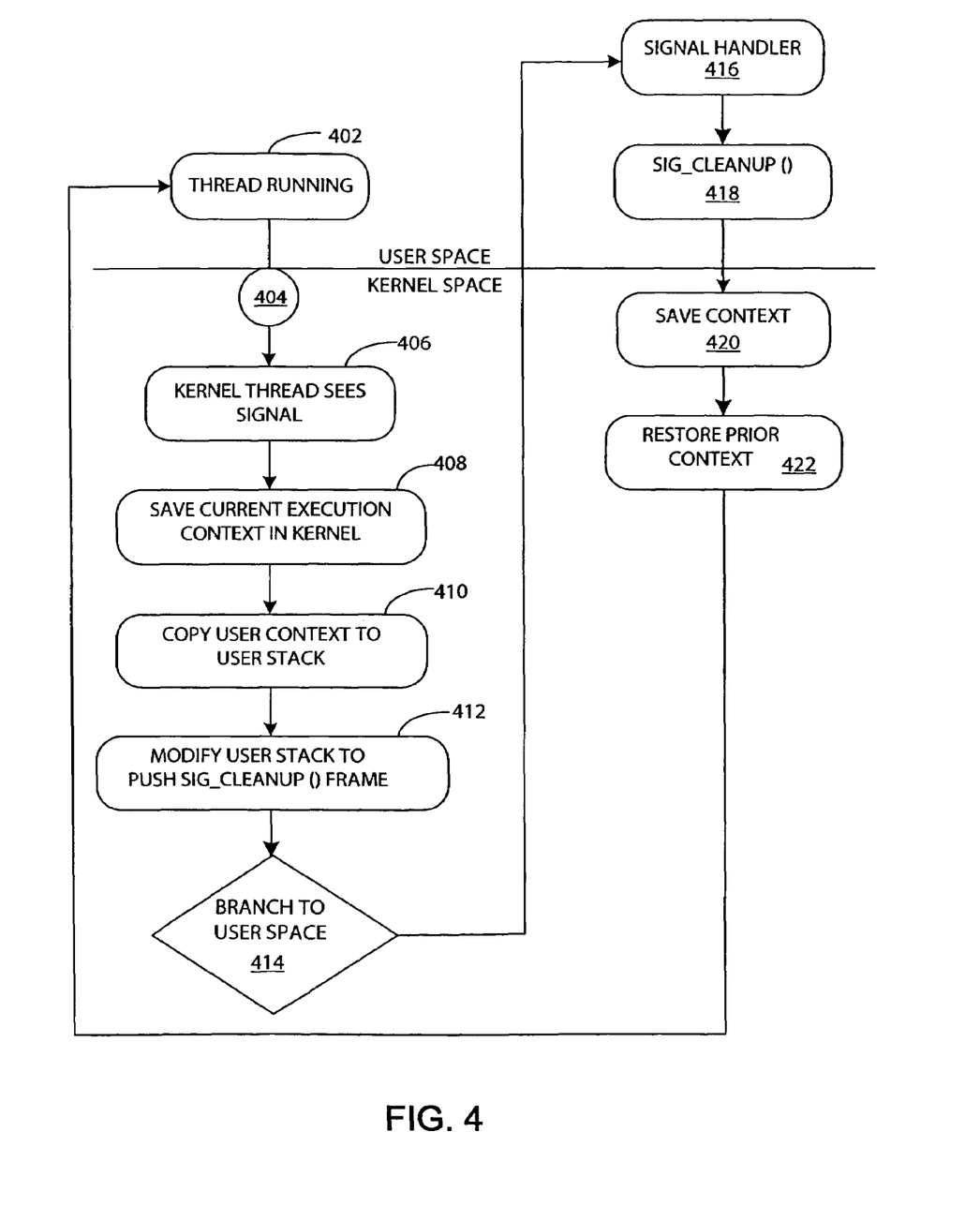
FIG. 4 is a flowchart illustrating how signal handling is performed in a HPUX™ system that implements M×N threading during the system return call path.

To facilitate discussion, FIGS. 3 and 4 illustrates how a system call may be made and how a signal is handled in the system call return path in a M×N thread model system, such as in a HP-UX™ system by the Hewlett-Packard Company of Palo Alto, Calif. Currently, the mechanism illustrated in FIGS. 3 and 4 represents the primary mechanism available to execute a user space code segment from the kernel (i.e., by launching a signal handler).

FIG. 3 illustrates a simplified method of handling systems calls between the user-space and the kernel space. In the example of FIG. 3, a read system call is employed as an example although other system calls may work analogously. In block 302, the application makes a system call read( ), which begins as a user-space thread. The user-space thread read ( ) then jumps to the user-space stub read_sys ( ) to handle the system call in block 304.

From the user-space stub read_sys ( ), a transfer through a gateway facilitates a privileged transfer to the kernel space, which has a higher privilege than the user space. Specifically, the privileged transfer invokes a system call initialization routine syscallinit (block 306), which saves user space context of the application (i.e. the contents of the register state), into a save-state.

In block 308, the high-level system call sys_call ( ) is invoked in order to, for example, marshal the necessary arguments for the actual kernel system call READ, which is shown in block 310. The kernel system call READ then performs the action required by the application, as specified originally in block 302. In the case of READ, the reading of data may involve waiting until the I/O device (e.g., the hard disk or a data on a network) becomes available. In such a case, the kernel thread is "blocked" and the system call is essentially in a wait state, waiting for unblocking to occur before the system call can be completed. Reference number 312 as shown illustrates the kernel system call block in FIG. 3.

Suppose the I/O device permits reading at some point in time. Once the kernel system call READ acquires the required data, the kernel thread is unblocked and can begin to initiate the system call return process. In block 314, the context data, which is previously saved in block 306, is restored via the syscallinit routine. Once the registers are restored, the user-space privilege is restored to allow the thread to branch back to the user-space stub read_sys ( ) of block 304. From user-space stub read_sys ( ) of block 304, a branch is made to the original user-space system call read ( ) in block 302, which then completes the system call by the application. This is how system calls work on HP-UX™.

Generically speaking, in a M×N thread system, signal handlers are launched from the kernel by saving the current execution context onto the thread's user stack. The signal handler return frame is then pushed onto the user stack to allow the signal handler to return back to the kernel once it finishes execution of the syscall or trap return. A branch to the user-space signal handler is made, followed by execution of the user-space signal handler code. On return from the signal handler, the control frame transfers the fabricated frame, which is basically set up to execute the system call sigcleanup, which transfer control back to kernel.

FIG. 4 is a flowchart illustrating how signal handling is performed in a HPUX™ system that implements M×N threading during the system return call path. In block 402 represents a thread running in user space. At some point this thread needs to make a system call and thus enters the kernel. The thread, on entry into the kernel will save its context data in block 404 (as shown earlier in FIG. 3, block 306). After completing the system call, on the return path In block 406, the kernel thread sees the signal and has to handle it. It first saves the current execution context in the kernel (block 408), including for example the current kernel registers, in order to service signal.

In block 410, the user context data stored earlier in block 404 is copied onto the user stack in the user space for restoration at a later time. In block 412, the user stack in the user space is modified to allow a system call sigcleanup frame to be pushed onto the user stack. This frame is setup to allow the clean up to take place after the signal handler finishes. Subsequently, block 414 branches to the user space. In block 416, a signal handler is launched in the user space to execute the signal handler user space code. In block 418, the sigcleanup frame, which was pushed onto the user stack earlier in block 412, is popped to enable a privileged transfer back into the kernel to restore previously saved context data in the kernel. Thus in block 420, in the kernel space, the user context data is saved. This context data saving step is analogous to that performed in block 404 earlier.

In block 422, the execution context stored earlier in block 408 is restored. Block 422, takes the thread back to user space from where it entered the kernel. The operation described above, although for a system call, is applicable to the trap path as well.

Figure 5:
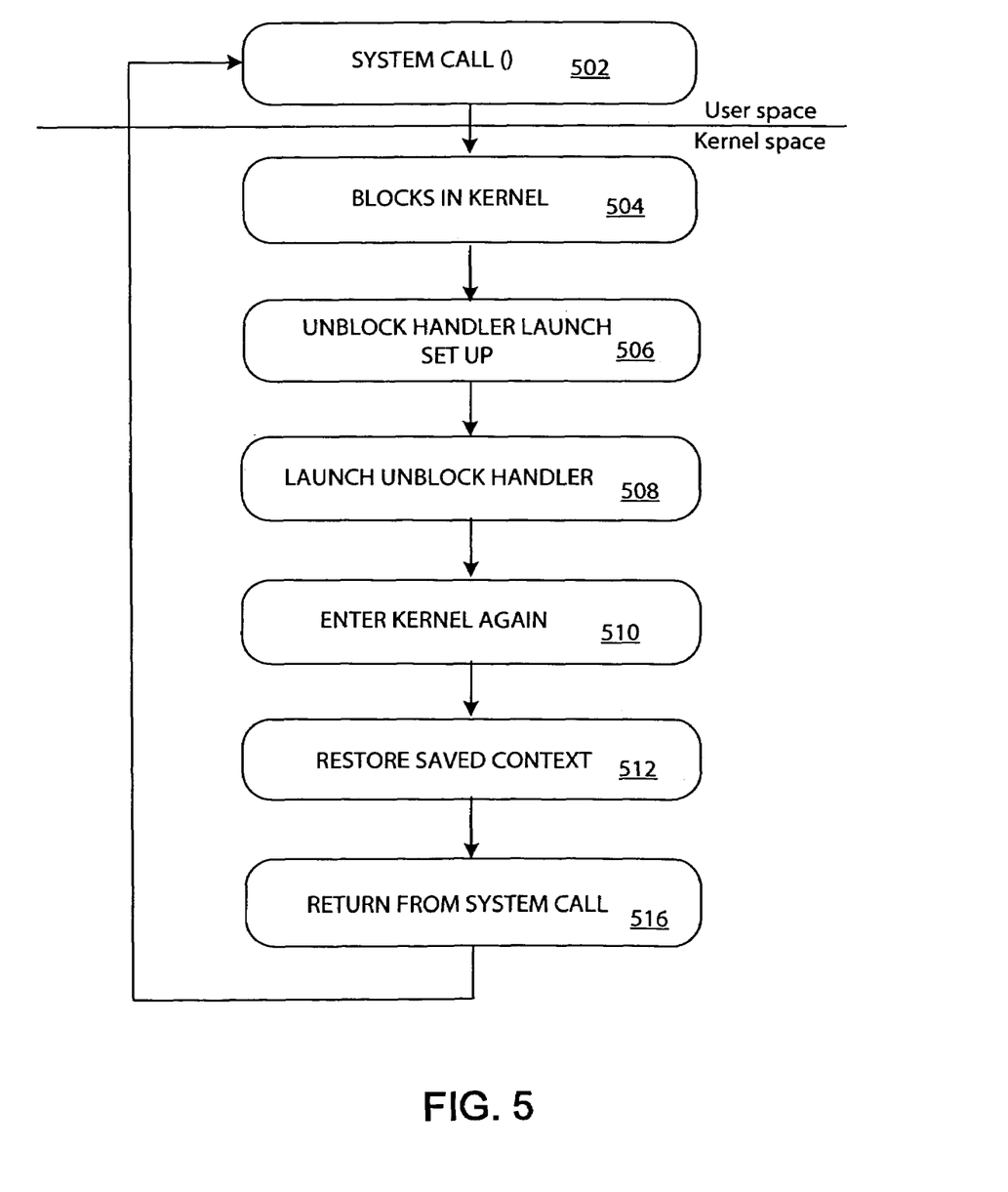
FIG. 5 shows the steps implementing an upcall as a signal handler in a M×N thread system.

While the approach above works fine for signal handlers, significant performance degradation is experienced if the signal handler approach is employed to handle "upcalls." To illustrate, FIG. 5 shows the steps implementing an upcall as a signal handler in a M×N thread system. In block 502, the application makes a system call that requires the use of a kernel thread. The user-space context data is saved once upon entering the kernel, as described before in block 404 of FIG. 4. In block 504, the kernel thread is blocked. With respect to the READ system call example, the kernel thread may be blocked while waiting for the I/O device to become available, for example. After the kernel thread is unblocked, the unblock handler launch setup occurs in block 506. In this case, the unblock handler is set up as a signal handler.

In block 506, the current execution context is saved, and the user-space context data stored earlier upon entering the kernel space is copied onto the user stack in the user space. The steps associated with block 506 is analogous to those described in blocks 408, 410, and 412 of FIG. 4. After block 506, a branch into the user space occurs.

In block 508, the unblock handler is launched, which results in for example the notification to the user space scheduler that unblocking of the kernel thread has occurred. The launching and execution of the unblock handler is analogous to the steps described in connection with blocks 416 and 418 of FIG. 4. After block 508, a branch back into the kernel space occurs (block 510). Also in block 510, the user context data is saved upon entering the kernel space.

In block 512, the execution context stored earlier in block 506 is restored, enabling a return to the user space (block 516).

As can be seen in FIG. 5, implementing an upcall as a signal handler requires, in addition to the saving of the user-space context upon entering the kernel space (e.g., between blocks 502 and 504 of FIG. 5), two additional save operations and a copy operation as overhead. The first save operation involves saving the current execution context in block 506. The second save operation involves saving the user-space context upon reentering the kernel space (block 510). The copy operation involves copying the user-space context data into the user stack (block 506). These overhead operations are handled using kernel resources, which tend to be the limiting factor in most systems since kernel resources are comparatively expensive. Additionally, an application may involve hundreds or thousands of system calls in its execution lifetime. With the extra overhead on the kernel resources impacting each system call blocking and unblocking, the arrangement of FIG. 5 results in a significant degradation in system performance.

SUMMARY OF INVENTION

The invention relates, in one embodiment, to a computer-implemented method for executing an application system call, the application system call involving invoking a kernel thread from a system call stub in a user space of an operating system of the computer. There is included saving user space context data in a save state upon entering a kernel space of the operating system from the user space. There is further included modifying a return pointer in the save state to an address of a unblock handler call stub in user space instead of an address of the system call stub in the user space, thereby causing the kernel thread to return to the unblock call handler stub instead of returning to the system call stub when the kernel thread completes execution.

In another embodiment, the invention relates to an article of manufacture comprising a program storage medium having computer readable code embodied therein. The computer readable code is configured for executing an application system call. The application system call involves invoking a kernel thread from a system call stub in a user space of an operating system of the computer. There is included code for saving user space context data in a save state upon entering a kernel space of the operating system from the user space. There is also included code for modifying, after the saving, a return pointer in the save state to an address of a unblock handler call stub in user space instead of an address of the system call stub in the user space, thereby causing the kernel thread to return to the unblock call handler stub instead of returning to the system call stub when the kernel thread completes execution.

In yet another embodiment, the invention relates to a computer-implemented method, in a computer implementing M×N threading, for executing an application system call from a user space of an operating system of the computer. The application system call involves invoking a kernel thread in a kernel space of the operating system from a system call stub in a user space of the operating system. There is included saving user space context data in a save state upon entering the kernel space. There is further included modifying a return pointer in the save state to an address of a unblock handler call stub in user space instead of an address of the system call stub in the user space, thereby causing the kernel thread to return to the unblock call handler stub instead of returning to the system call stub when the kernel thread completes execution. Additionally, there is included returning from the unblock call handler stub in the user space to the system call stub in the user space without entering the kernel space again.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Since upcalls are invoked frequently during the execution lifetime of a typical application, especially an application that requires lots of I/O accesses, it is imperative that upcalls be made as efficient as possible. In accordance with one embodiment of the present invention, there is provided an inventive arrangement and method for invoking an upcall during a system call return in a manner so as to avoid the performance penalties associated with implementing upcall as a signal handler.

The invention, in one embodiment, circumvents the need to copy the context data onto the user stack, setting up a user stack frame, and returning to the kernel to complete system call return. In one embodiment, the upcall stub acts as a springboard to branch to the upcall handler. The upcall handler stub may be implemented in architecture-specific code, which avails architecture-specific features to further enhance performance. Additionally, the invention requires substantially no modification to the syscall stub(s), and hence raises no compatibility issues with existing systems.

In one embodiment, the launch of an upcall handler involves the installation of the upcall handler, which involves an initial setup during application startup. During the initial setup, the address of the user space upcall handler stub and the data pointer corresponding to this address is registered with the kernel. This may be done, for example, during the thread library startup, which is executed before the start of the application code.

Figure 6:
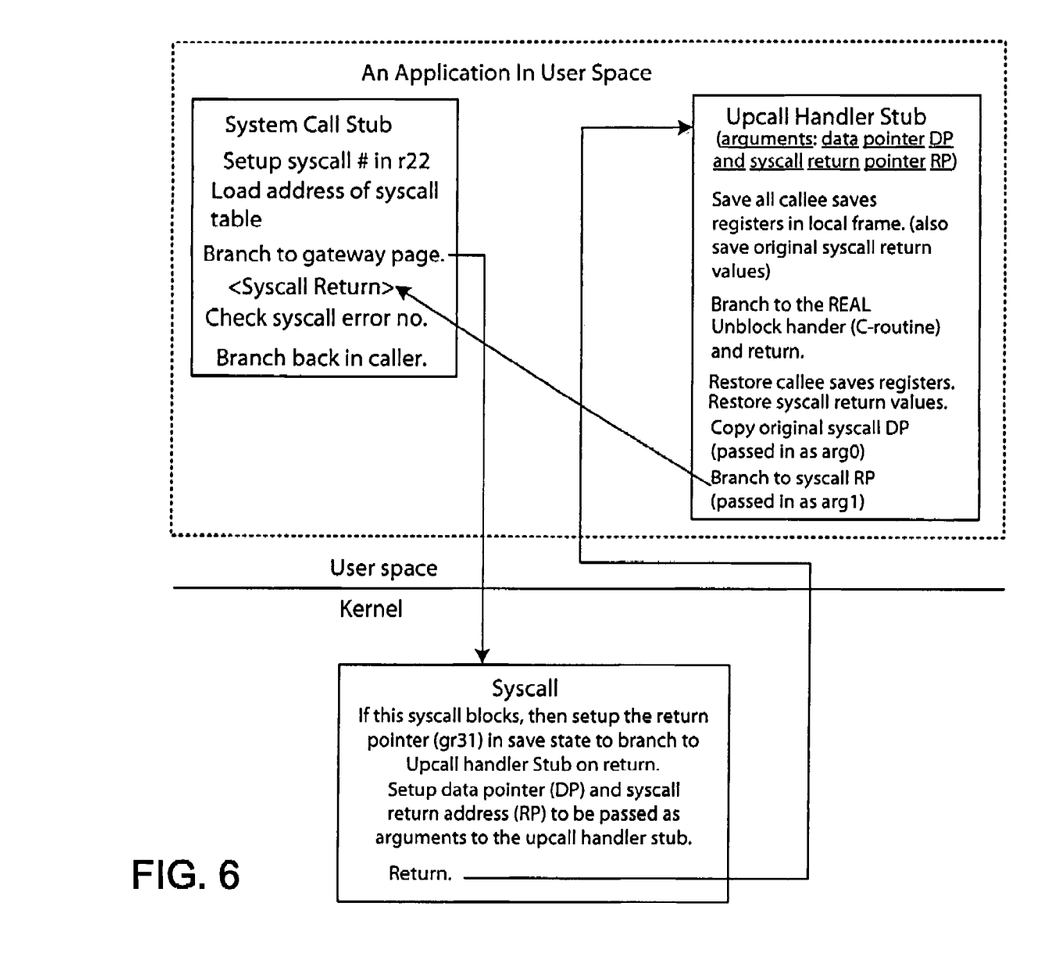
FIG. 6 illustrates, in accordance with one embodiment, the steps involved in invoking an upcall.

FIG. 6 illustrates, in accordance with one embodiment, the steps involved in invoking an upcall. When the thread executes a blocking system call, the thread goes to a wait mode or to sleep in the kernel. Before it goes to a wait mode, however, the application save-state (the register context of the thread in the user space) is modified such that the return pointer (e.g. gr31 in PA-RISC™ architecture) returns to the upcall handler stub. Further, the data pointer is modified to the upcall handler's stub's data pointer. The original data pointer and return pointer are, however, setup to be passed as arguments to the upcall handler stub.

When the thread wakes up from its wait mode or its sleep and returns from the system call, it returns to the upcall handler stub, since the save state (and more specifically the return pointer in the save state) is modified to return to the upcall handler stub. The upcall handler stub then acts as a springboard to jump to the real upcall handler. The real upcall handler is a notification mechanism to the user space scheduler. After the real upcall handler is executed, the thread should prepare to branch back to the system call stub, from where it started. So the system call return values, the system calls stub's data pointer, and the return pointer of the system call stub are restored. A branch to the return pointer of the syscall stub then transfers control to the syscall stub. At that point, the syscall stub will continue as if a normal return from the system call has occurred.

Figure 7:
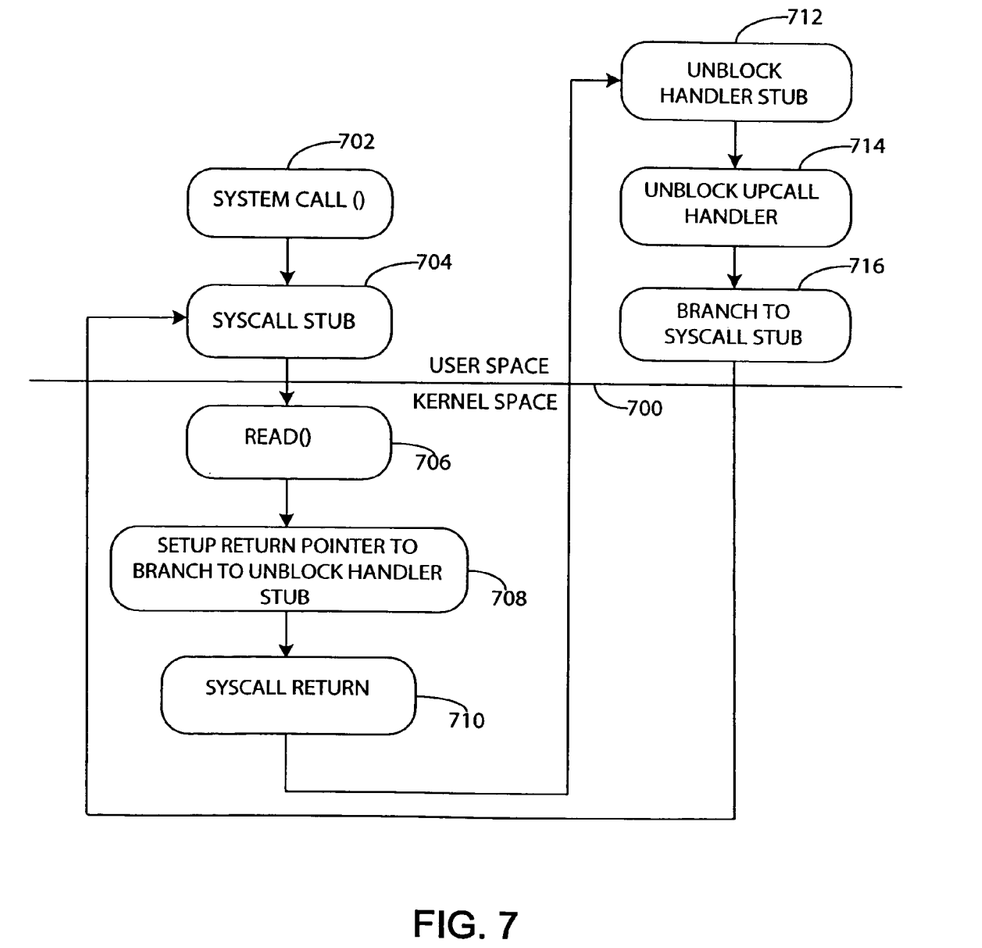
FIG. 7 illustrates, in accordance with another embodiment of the present invention, the steps involved in invoking an upcall.

FIG. 7 illustrates, in accordance with another embodiment of the present invention, the steps involved in invoking an upcall. In FIG. 7, the line 700 separates the user space (above line 700) from the kernel space (below line 700). In block 702, the application makes a system call (e.g., read). As before, the user space thread jumps to a user space system call stub (block 704) to facilitate a transfer to the higher privilege kernel space. During the transfer process to the higher privilege kernel space, the user space context data is saved as discussed earlier.

In block 706, the kernel thread executing the system call (e.g., read) is invoked. As mentioned, this kernel thread may be blocked due to, for example, the unavailability of the I/O device (e.g., the hard disk). Accordingly, the thread is essentially in a sleep or wait mode, waiting for unblocking to occur. At some point, unblocking occurs (e.g., the I/O device becomes available). At that point, the return pointer is set in block 708 to the address of the unblock handler stub. This modification is possible since the kernel knows in advance (e.g., during registration) the address of the unblock handler stub. The original return pointer (i.e., the pointer pointing to the syscall stub) is passed as argument to the user space unblock handler stub. Further, the data pointer is modified to the upcall handler's stub's data pointer. and the original data pointer, the system call return value and the original system call stub address is passed as an argument to the user space unblock handler stub.

In block 710, the thread branches to the address of the newly modified return pointer and returns to the unblock handler stub (block 712) instead of the syscall return stub. This is possible because, as mentioned earlier, the return pointer has been modified to point to the unblock handler stub instead of to the syscall return stub. The branch to the unblock handler stub accomplishes the transfer to the lower privilege user space. At this point, the unblock handler stub acts as a springboard to transfer the thread to the unblock upcall handler. In the M×N thread scenario, the unblock upcall handler may involve, for example, notifying the user space scheduler.

In block 716, after the user space unblock upcall handler is completed, a branch to the original return pointer, i.e., the return pointer associated with the user space syscall stub transfers control to the syscall stub (path 718). This is possible because the syscall return values, the syscall stub's data pointer, and the return pointer of the syscall stub, were passed to the unblock handler stub as arguments earlier.

After the user space unblock upcall handler is completed, these values are restored. After branching to the syscall stub, the syscall stub at that point behaves as if it has just experienced a return from a kernel system call, which may include returning to the original system call (via path 720) to conclude the system call.

Note that unlike the implementation of the upcall as a signal handler, there is no need to re-enter the kernel space after the user space upcall handler completes execution in order to complete the system call. This eliminates two context save operations and one context data copy operation. In comparison with FIG. 5, for example, the saving of the current execution context (in block 506) is no longer necessary. The second save operation involves saving the user-space context upon reentering the kernel space (block 510) is also not necessary. Further, the copy operation involves copying the user-space context data into the user stack (block 506) is also eliminated. Accordingly, expensive kernel resources are not wasted on these now-eliminated operations and performance is vastly improved, which further the goal and philosophy behind the M×N thread architecture.

While this invention has been described in terms of several preferred embodiments, there are alterations, permutations, and equivalents which fall within the scope of this invention. For example, although the invention works well with systems implementing the PA-RISC™ and IPF™ architectures (available from the aforementioned Hewlett-Packard Company and Intel Corporation of Santa Clara, Calif. respectively), it is contemplated that the invention may work with any suitable systems implementing M×N threading. It is therefore intended that the following appended claims be interpreted as including all such alterations, permutations, and equivalents as fall within the true spirit and scope of the present invention.

What is claimed is:

1. In a computer, a computer-implemented method for executing an application system call, said application system call involving invoking a kernel thread from a system call stub in a user space of an operating system of said computer, comprising:
saving user space context data in a save state upon entering a kernel space of said operating system from said user space; and
thereafter modifying a return pointer in said save state to an address of a unblock handler call stub in user space instead of an address of said system call stub in said user space, thereby causing said kernel thread to return to said unblock call handler stub instead of returning to said system call stub when said kernel thread completes execution, wherein the unblock handler call stub subsequently transfers the kernel thread to an unblock upcall handler which communicates with a scheduler in the user space; registering said address of said unblock call handler stub with a kernel of said poeration system prior to said executing said application system call.

2. The computer-implemented method of claim 1 wherein said registering is performed during application startup.

3. The computer-implemented method of claim 1 wherein said registering is performed during a thread library startup.

4. The computer-implemented method of claim 1 further including registering a data pointer associated with said address of said unblock call handler stub with said kernel.

5. The computer-implemented method of claim 1 further including passing, after said saving, a data pointer associated with said system call stub as an argument to said unblock call handler stub.

6. The computer-implemented method of claim 5 further including passing, after said saving, a return value of said system call and an address of said system call stub as arguments to said unblock call handler stub.

7. The computer-implemented method of claim 6 further including branching from said unblock call handler stub to the unblock call handler in said user space.

8. The computer-implemented method of claim 7 further including branching from said unblock call handler to said system call stub in said user space when said unblock call handler finishes executing without the kernel thread returning to said kernel space.

9. The computer-implemented method of claim 7 wherein said unblock call handler routine includes code for notifying the scheduler in said user space that said kernel thread is unblocked.

10. The computer-implented method of claim 1 wherein said computer implements a PA-RICS™ (Precision Architecture-Reduced Instruction Set computing) architecture.

11. The computer-implemented method of claim 1 wherein said computer implements a PA-IPF™ (Precision Architecture Itanium Processor Family) architecture.

12. The computer-implemented method of claim 1 wherein said computer implements M×N threading.

13. The computer-implemented method of claim 1 wherein said system call involves accessing an I/O device.

14. An article of manufacture comprising a program storage medium having computer readable code embodied therein, said computer readable code being configured for executing an application system call, said application system call involving invoking a kernel thread from a system call stub in a user space of an operating system of said computer, comprising:
code for saving user space context data in a save state upon entering a kernel space of said operating system from said user space; and
code for modifying, after said saving, a return pointer in said save state to an address of a unblock handler call stub in user space instead of an address of said system call stub in said user space, thereby causing said kernel thread to return to said unblock call handler stub instead of returning to said system call stub when said kernel thread completes execution, wherein the unblock handler call stub transfers the kernel thread to an unblock upcall handler which communicates with a scheduler in the user space registering said address of said unblock call handler stub with a kernel of said operating system prior to said executing said application system call.

15. The article of manufacture of claim 14 wherein said registering is performed during one of an application startup and a thread library startup.

16. The article of manufacture of claim 14 further including code for registering a data pointer associated with said address of said unblock call handler stub with said kernel.

17. The article of manufacture of claim 14 further including code for passing, after said saving, at least one of a data pointer associated with said system call stub, a return value of said system call and an address of said system call stub as an argument to said unblock call handler stub.

18. The article of manufacture of claim 14 further including code for branching from said unblock call handler stub to the unblock call handler in said user space.

19. The article of manufacture of claim 18 further including code for branching from said unblock call handler to said system call stub in said user space when said unblock call handler finishes executing without returning to said kernel space.

20. The article of manufacture of claim 14 wherein said unblock call handler includes code for notifying the scheduler in said user space that said kernel thread is unblocked.

21. The article of manufacture of claim 14 wherein said computer implements M×N threading.

22. In a computer implementing M×N threading, a computer-implemented method for executing an application system call from a user space of an operating system of said computer, said application system call involving invoking a kernel thread in a kernel space of said operating system from a system call stub in a user space of said operating system, comprising:

saving user space context data in a save state upon entering said kernel space;

thereafter modifying a return pointer in said save state to an address of a unblock handler call stub in user space instead of an address of said system call stub in said user space, thereby causing said kernel thread to return to said unblock call handler stub instead of returning to said system call stub when said kernel thread completes execution, and     returning from said unblock call handler stub in said user space to said system call stub in said user space without entering said kernel space again, wherein the unblock handler call stub transfers the kernel thread to an unblock upcall handler which communicates with a scheduler in the user space; registering said address of said unblock call handler stub with a kernel of said operating system prior to said executing said application system call.

23. The computer-implemented method of claim 22 further including passing, after said saving, a data pointer associated with said system call stub, a return value of said system call, and an address of said system call stub as arguments to said unblock call handler stub.

24. The computer-implemented method of claim 22 further including registering said address of said unblock call handler stub with a kernel of said operating system prior to starting up of an application executing said application system call.

25. The computer-implemented method of claim 22 further including branching from said unblock call handler stub to the unblock call handler in said user space prior to branching to said system call stub.

26. The computer-implemented method of claim 25 wherein said unblock call handler includes code for notifying the scheduler in said user space that said kernel thread is unblocked.

* * * * *

UNITED STATES PATENT AND TRADEMARK OFFICE
CERTIFICATE OF CORRECTION

PATENT NO. : 7,360,223 B2  Page 1 of 1
APPLICATION NO. : 10/670482
DATED : April 15, 2008
INVENTOR(S) : Vishwas P. Durai It is certified that error appears in the above-identified patent and that said Letters Patent is hereby corrected as shown below:

In column 1, line 41, delete "nave" and insert -- have --, therefor.

In column 2, line 34, delete "syscallinit" and insert -- syscallrtn --, therefor.

In column 7, line 45, in Claim 1, delete "poeration" and insert -- operating --, therefor.

In column 8, line 8, in Claim 10, delete "computer-implented" and insert -- computer-implemented --, therefor.

In column 8, line 9, in Claim 10, delete "PA-RICS™" and insert -- PA-RISC™ --, therefor.

In column 8, line 13, in Claim 11, delete "Architecture Itanium" and insert -- Architecture-Itanium --, therefor.

In column 8, line 37, in Claim 14, after "space" insert -- ; --.

In column 8, line 63, in Claim 21, delete "claim 14" and insert -- claim 20 --, therefor.

Signed and Sealed this

Twenty-ninth Day of July, 2008

JON W. DUDAS
*Director of the United States Patent and Trademark Office*